United States Patent [19]

Broyles et al.

[11] 4,408,595
[45] Oct. 11, 1983

[54] TURRET MOUNTED SOLAR CONCENTRATOR WITH BOOM MOUNTED SECONDARY MIRROR OR COLLECTOR

[76] Inventors: Howard F. Broyles, 4283 Aralia Rd., Altadena, Calif. 91001; Mark L. White, 2535 Whittier Dr., La Cresenta, Calif. 91214; Neil F. Dipprey, 20920 Anza Ave. #353, Torrance, Calif. 90503

[21] Appl. No.: 939,346

[22] Filed: Sep. 5, 1978

[51] Int. Cl.³ .............................................. F24J 3/02
[52] U.S. Cl. .................................... 126/424; 126/438
[58] Field of Search ............... 126/271, 270, 424, 425, 126/438, 439; 237/1 A

[56] References Cited

U.S. PATENT DOCUMENTS

| | | | |
|---|---|---|---|
| 811,274 | 1/1906 | Carter | 126/271 |
| 2,572,430 | 10/1951 | Balton . | |
| 3,152,260 | 10/1964 | Cummings | 126/271 |
| 3,179,105 | 4/1965 | Falbel | 126/271 |
| 3,200,820 | 8/1965 | Garrett | 126/271 |
| 3,905,352 | 9/1975 | Jahn | 126/270 |
| 4,030,890 | 6/1977 | Diggs | 126/271 |
| 4,038,972 | 8/1977 | Orrison | 237/1 A |
| 4,068,474 | 1/1978 | Dimitroff | 126/271 |
| 4,078,547 | 3/1978 | Malecek | 126/271 |
| 4,111,184 | 9/1978 | Fletcher et al. | 126/271 |
| 4,129,360 | 12/1978 | Deflandre et al. | 126/270 |
| 4,195,775 | 4/1980 | Pitts . | |

OTHER PUBLICATIONS

Skolnik, "Offset Feed," *Introduction to Radar Systems*, Mc-Graw-Hill Book Co. Inc., N.Y. (1962), pp. 273-274.

*Primary Examiner*—Daniel J. O'Connor
*Attorney, Agent, or Firm*—Wagner & Bachand

[57] ABSTRACT

A solar energy concentrator/collector assembly employing an altitude-azimuth dual axis scanning mounting assembly including a base with a circular track for mounting the assembly for rotation about a vertical axis. The assembly includes a turret defining second pivotable axis normal to the vertical axis and intersecting the same. A boom, a concentrator and a collector act as a single rotational assembly during solar collection and fold together during non-operating periods to minimize the profile and wind loading. In one preferred embodiment the solar energy collector is fixed and located at the intersection of the two axes and a boom carries a secondary mirror reflecting solar energy from said primary mirror to the solar energy collector which may be a Stirling cycle engine or other heat engine. In an alternate embodiment the solar energy collector is located on the boom at the focus region of the solar concentrator.

18 Claims, 13 Drawing Figures

TURRET MOUNTED SOLAR CONCENTRATOR WITH BOOM MOUNTED SECONDARY MIRROR OR COLLECTOR

BACKGROUND OF THE INVENTION

Recent years have been an explosive development in the field of solar energy collection and utilization. The largest area of development and expansion appears to be in the area of flat plate collectors. This is believed to be explained because of the relative simplicity of such devices. An inherent limitation in flat plate collectors however, is that the energy as collected is distributed over a broad area and usually at a relatively low concentration. No truly efficient collection process has been developed for plate collectors. Thus flat plate collectors which require a large geographic area are found use principally in hot water heaters and other applications where large areas are available and the temperature requirements are not high.

For any type of collection system where the energy will be conveyed and used in almost any form other than a heated collection medium such as water, a solar concentrator is required. Solar concentrators have not been favored because of lack of familiarity with them; the need for rather sophisticated and expensive mirror systems and a concern for injury to persons who might be exposed to the concentrated solar energy. A careful examination however of these limitations show that they are not or should not be controlling. With recent development in improved low cost mirrors and a recognition that a solar concentrator can be a safe device when properly designed and installed, it is believed that a concentrating collector provides a vastly superior solar energy collection system to that of the flat plate type.

Given a superiority it is encumbant upon the art to provide a truly practical concentrator/collector system and particularly one which is compatible with home or recreational vehicle applications and thus come within a reasonable cost limitation.

BRIEF DESCRIPTION OF THE INVENTION

Given the foregoing state of the art we have an improved solar energy concentrator/collector assembly which comprises basically a base which defines a circular track of, for example, six-foot diameter. Mounted from the track is a turret assembly comprising a framework with three equal angularly spaced roller assemblies engaging the track for rotation about a vertical axis defined by the base. The turret assembly mounts a second or horizontal axis from which the concentrator/collector sub-assembly is mounted for rotation about the horizontal axis. Thus, the sub-assembly is positioned for movement to scan the entire hemisphere above the base. The concentrator/collector assembly comprises an elongated boom carrying the collector at its outermost region and the concentrator constituting a series of mirror elements mounted to one side of the horizontal axis and positioned to concentrate energy on the boom mounted collector. The mirror assemblies are supported from a framework which in itself is pivotally secured to the boom whereby the concentrator mirror may be folded down against the boom during periods of non-use and thereby minimize the profile and wind loading of the device. For recreational vehicle use this would be during periods of transport or at night.

The two axes of rotation of the assembly intersect and in one embodiment energy reflects from a secondary mirror on the boom to a fixed receiver positioned on at or near the base.

In an alternate embodiment, the solar collector is on the boom and energy conducting means communicates between the solar collector on the boom and the region of the intersection of the two axes allowing the easy transfer of energy to a fixed receiver positioned on, at or near the base. The solar collector may, for example, be a Stirling or other heat engine and the receiver may, for example, be an electrical junction box.

The mirror assembly is made up of plurality of mirror sections, each individually mounted, and together defining a parabolic section. The solar energy collector is preferably a Stirling (or other heat) engine with an energy input window facing the concentrator and secondary mirror.

Suitable drive, sun-seeking and followup controls may be used to cause the assembly to track the sun and achieve maximum energy transfer.

The mirror assembly is made up of plurality of back surfaced mirror sections each individually mounted and together defining a parabolic section. The solar energy collector is preferably a Stirling engine with an energy input window facing the concentrator and secondary mirror.

Suitable, drive sun-seeking and followup controls may be used to cause the assembly to track the sun and achieve maximum energy transfer.

BRIEF DESCRIPTION OF THE DRAWINGS

This invention may be more clearly understood from the following detailed description and by reference to the drawing in which.

DETAILED DESCRIPTION OF THE INVENTION

Figure 1:
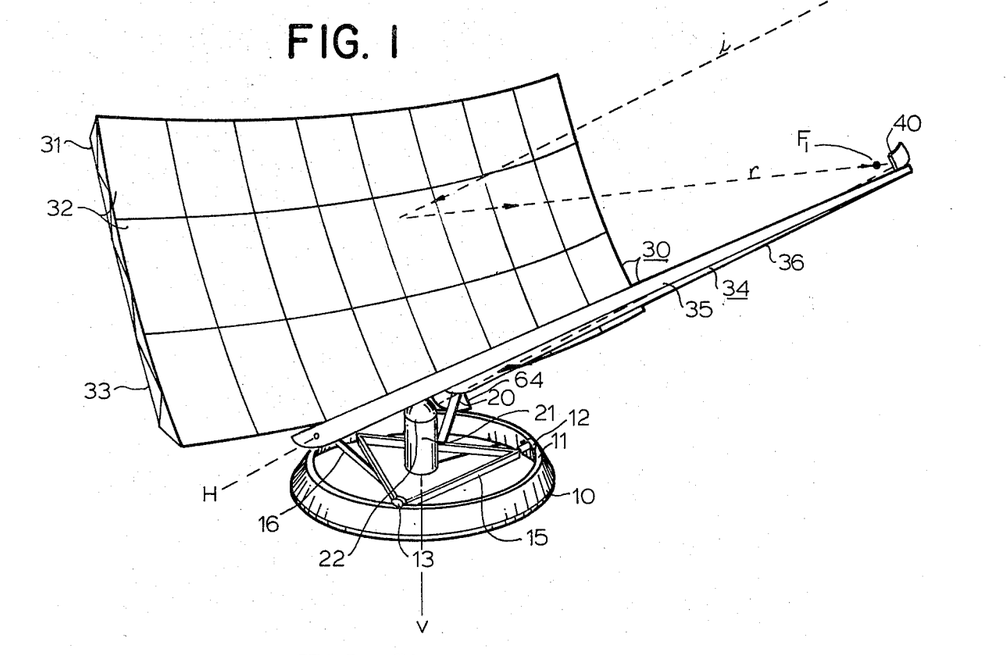
FIG. 1 is a perspective view of an embodiment of this invention.
Figures 2, 2A, 5:
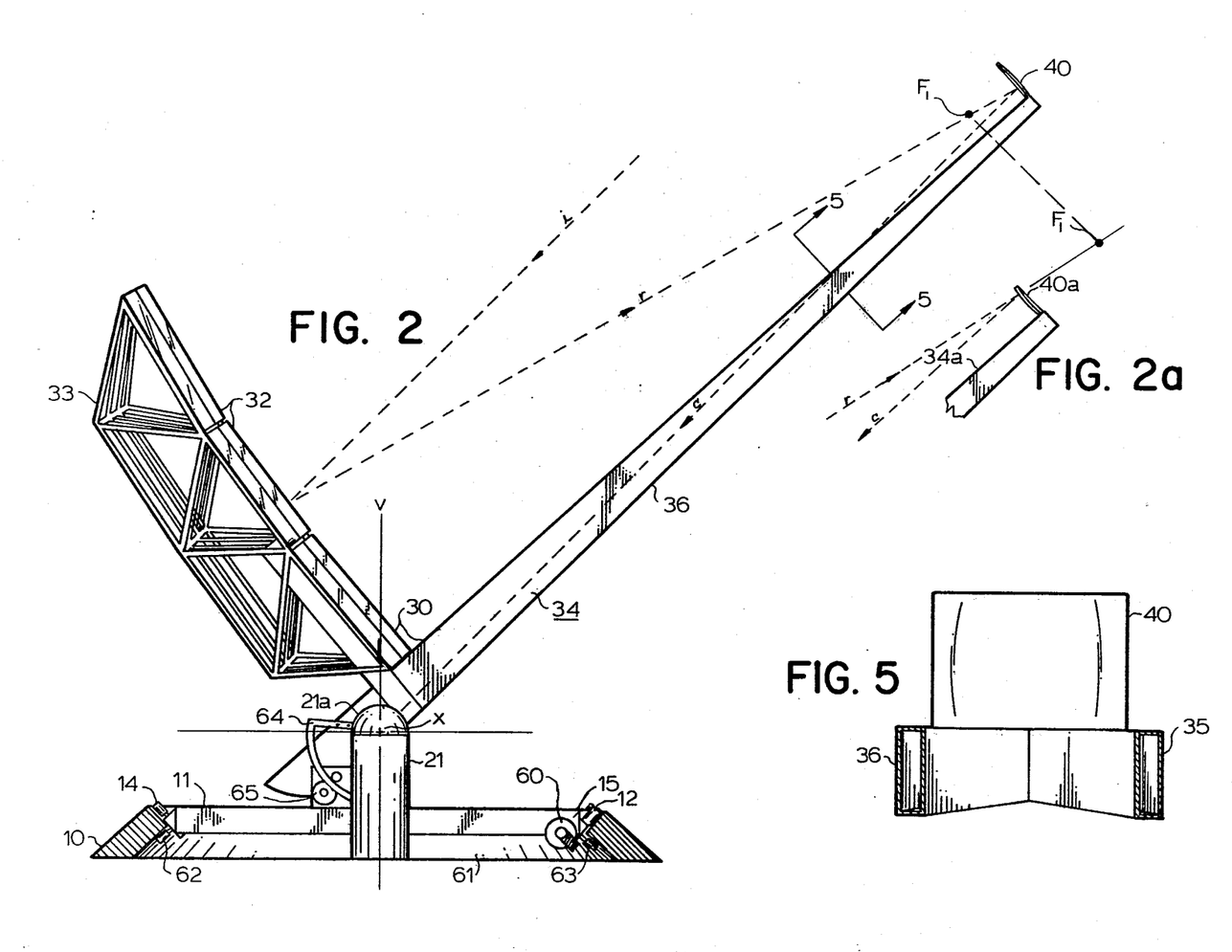
FIGS. 2 and 2a are vertical sectional views taken along the vertical centerline of the concentrator boom assembly of the embodiment of FIG. 1.
FIG. 5 is a vertical sectional view taken along lines 5—5 of FIG. 2.
Figures 6, 7:
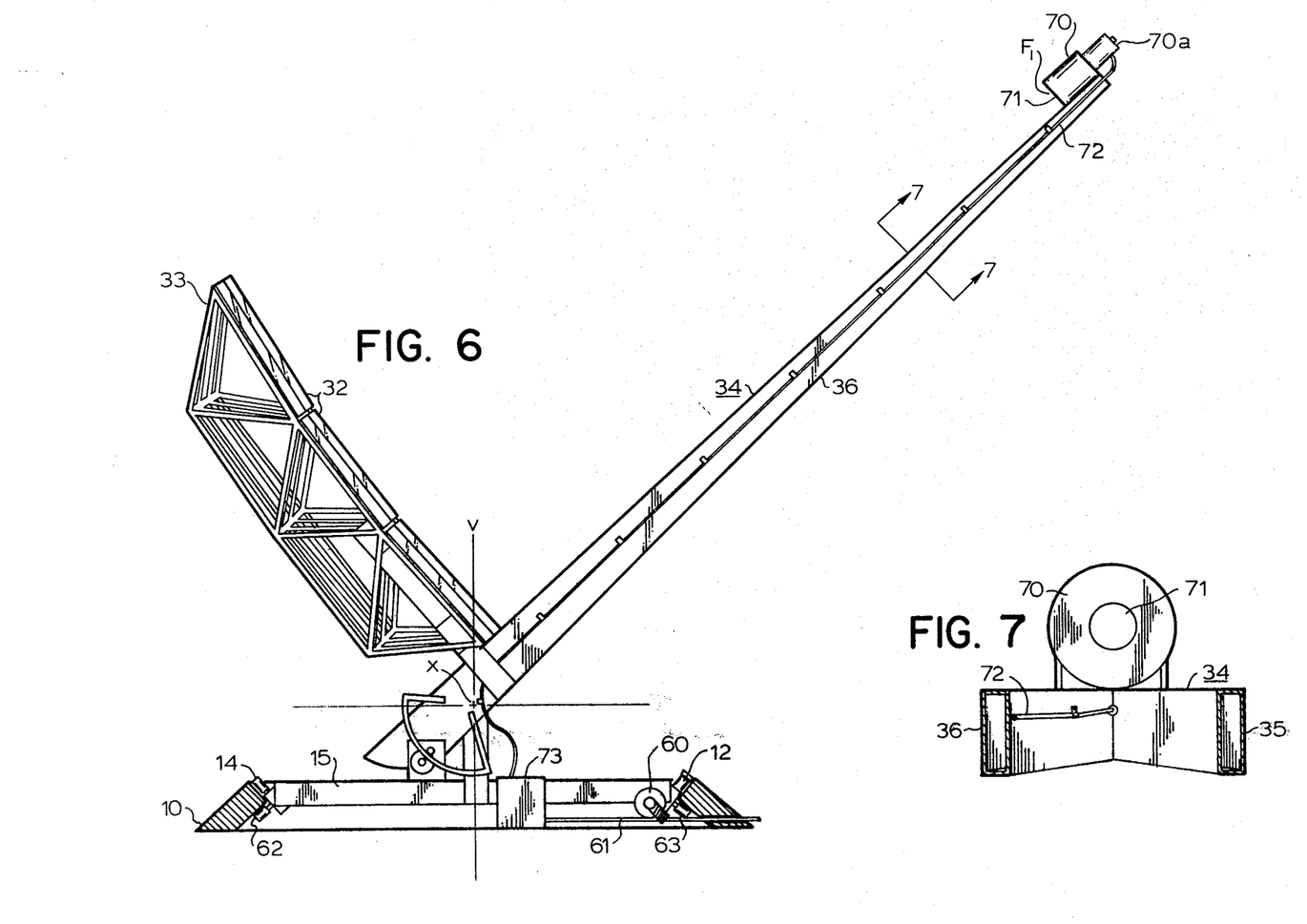
FIG. 6 is a vertical sectional view of an alternate embodiment employing a boom mounted collector.
FIG. 7 is a vertical section of the embodiment of FIG. 6 taken along lines 7—7 of FIG. 6.
Figure 8:
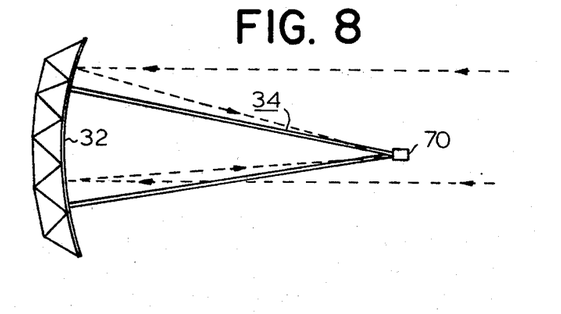
FIGS. 8 and 9 are simplified sketches of the embodiment of FIG. 6 showing ray patterns in the horizontal and vertical planes respective.
Figure 9:
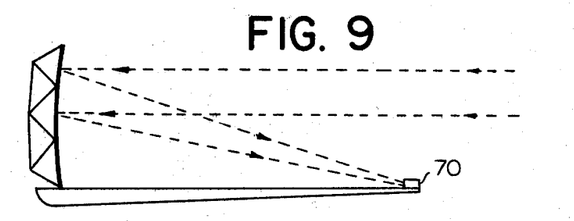

Our invention may be seen in FIG. 1 as employing a base member 10 which is preferably a circular metal or concrete track in the order of 6 feet in diameter and currently secured to either the ground or the surface of a structure which is served by the solar energy collector of this invention. The base 10 includes a frusto-conical surface 11 on which three rollers 12, 13 and 14, two of which appear in FIG. 1, roll and support a triangular turret 15 having an open center. The details of the mounting of the turret are more clearly visible in FIGS.

2 and 6. The turret includes a pair of stanchions 16 and 20 which extend vertically or in the embodiment of FIG. 1 upward and outwardly defining a horizontal axis H denoted by a dashed-dot line. The horizontal axis H intersects with the vertical axis V which is coincident with the center of the base 10 and the center of rotation of the turret 15. Coaxial with the vertical axis V is a solar energy receiver or utilization device 21 which may be for example a Stirling or other heat engine located under a window or dome 22. The entrance orifice of the receiver 21 is coincident with the intersection with the axes H and V.

Secured to the stanchion 16 and 20 for pivotable rotation around axis H is a concentrator assembly generally designated 30 and comprising a mirror assembly 31 having a number of discrete mirror elements 32 supported from their rear faces by a framework 33.

The concentrator assembly also includes a double-armed boom 34 including an arm 35 secured to stanchion 16 and an arm 36 secured to stanchion 20. Positioned on said boom is a secondary mirror 40 which may be either concave or convex depending upon its distance from the focus of the mirror 31.

In the preferred embodiments of this invention the mirror 32 is a portion of a parabola of revolution. In FIG. 1 the first focus $f_1$ is shown to be short of the boom 34 and in such case the mirror 40 is concave.

The concentrator/collector of FIGS. 1 and 2 is designed for rotational movement about the H and V axes. Movement about the vertical or azimuth axis V is accomplished by operation of drive motor 60 carried by the turret 15 driving the roller assembly 12. The motor 62 is under the control of automatic tracking systems of the type which are well known in the solar energy field. Rotation about the horizontal or altitude axis H is similarly produced by operation of a drive motor 65 appearing in FIG. 2. The motor 65 drives the boom 34 with respect to stanchions 16 and 20 of FIG. 1. The motor 65 driving the concentrator/collector assembly 30 may be secured to either stanchion 16 or 20 and driving though gears or friction rollers to make the approximately 90 degree corrections necessary for tracking about the horizontal axis H. Movement about the vertical axis V by motor 60 over 360 degrees is desirable but really only approximately 200 degrees of rotation is required.

Figure 3:
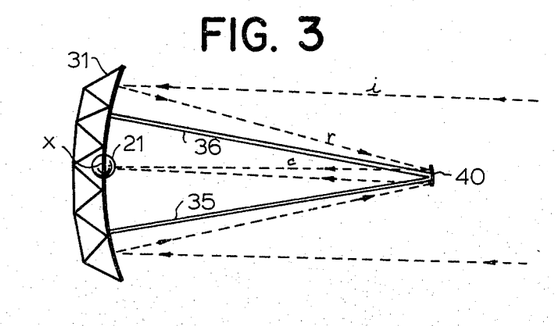
FIGS. 3, 3a, 4, and 4a are simplified sketches of the embodiment of FIG. 1 showing ray patterns in the horizontal and vertical planes respectively.
Figure 3A:
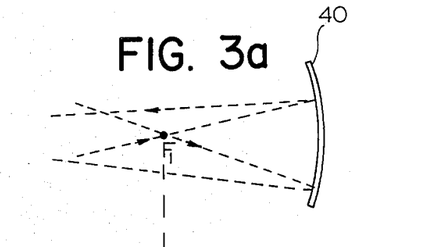
Figure 4:
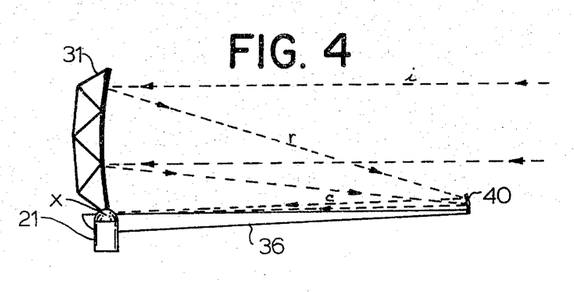
Figure 4A:
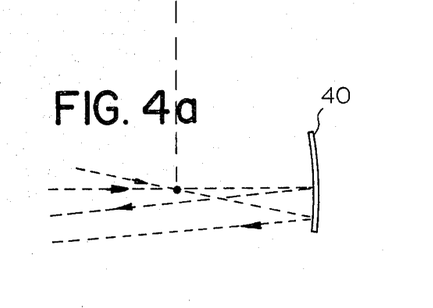

Now referring to FIGS. 3 and 4 and 3a and 4a, the angular relationship between the mirror assembly 31, the boom arms 35 and 36, the secondary mirror 40, and the energy collector or engine 21 is clearly visible. Incident energy from the sun is represented as dashed lines i and arrows with the outermost two rays reaching the mirror 31 as shown concentrated and redirected as rays r through focus $f_1$ as shown in FIGS. 3a and 4a, and then collected and redirected to the solar energy collector 21 as ray c. In both FIGS. 3 and 4 the intersection of the two axes H and V plus the energy entrance point for the energy receiver 21 are all coincident and shown as referenced by the letter x.

It is particularly apparent in FIGS. 3 and 4 that the mirror assembly is a portion of a parabola and does not extend below the line of concentrated beam identified as c.

It also should be apparent particularly in connection with FIGS. 3 and 4 that any movement of the entire assembly in tracking the sun results in the ray c passing through point x regardless or orientation of the mirror and boom as long as it is directed at the sun. This makes it possible that the energy receiver or engine 21 can be fixed and eliminates any need for moveable connections between the energy receiver and external utilization equipment. For example, when the energy receiver 21 is a heat engine operating an electrical generator the output is conducted in an electrical conduit which may be buried in the ground or for that matter located above the ground but below the turret 15 shown in FIG. 1 and through the ring 10 to point of use. Sufficient clearance exist below the turret 15 as shown in FIG. 1 to allow surface wiring.

The operative relationship of each of these elements is further illustrated in FIG. 2 which is a vertical section through the apparatus coincident with the collection line c of FIGS. 3 and 4.

In FIG. 2 a horizontal drive motor 60 coupled to roller 12 may be seen. Also in FIG. 2 the frust-conical surface 11 appears as inclined inward to aid in automatic centering of the turret 15. Stability in the presence of movement and wind loading is further achieved in accordance with this invention since a second frust-conical surface 61 exists on the base 10 intersecting with the surface 11 at a fixed angle which preferably is a 90 degree angle. Friction rollers 62 and 63 secured to the turret 15 bear agnist surface 61 and thereby secure the turret in position while allowing its free rotation around the axis.

In FIG. 2 the mechanism for elevating the assembly may be seen to include a sector arm 64 which engages a motor drive 65. Because of the relatively balanced nature of the concentrator assembly 30 when in the solar energy collecting condition the energy required for driving the assembly in the elevation mode or the turret in the training mode is slight. Only fractional horsepower motors are believed to be required for the tracking function.

In the interest of minimizing power requirements and minimizing overall size the arrangement of this invention is particularly versatile. As an example, in the embodiment of FIGS. 1 and 2 the secondary mirror 40 is located beyond the first focus $f_1$. This means that the boom 34 is of slightly greater length than the focal distance of the mirror assembly 31. If size limitations or restrictions result in the desire for a shorter boom this can be accomplished as is illustrated in 2a. In that case the focus $f_1$ is beyond the end of the boom 34a and the mirror 40a is convex. The particular application will determine whichever design is desired.

The general appearance of the secondary mirror 40 of the solar energy collector 21 is illustrated by the fragmentary view of FIG. 5. In this case the boom arms 35 and 36 are shown to be hollow, rectangular structural members although I-beams, channels or other desired shapes may well be used. Preferably they are of lightweight material such as aluminum or aluminum alloy in order to minimize weight. The load on the boom 34 is not great and thus light-weight materials may easily be used.

With the recent development of light-weight effective solar engines such as the Stirling engine developed by William Beale of Athens, Ohio, and described in Popular Science, Vol. 212, Page 74, et seq., published June 1978 it is now possible to mount the engine directly on the boom as illustrated in FIGS. 6 and 7. The assembly of FIGS. 6 and 7 are geometrically the same as in FIG. 2 and each of the identical elements carry the same reference numeral used therein. In this embodiment the solar energy collector, namely an engine 70, is now located on the boom with its entrance orifice 71 located approximately at the first focus $f_1$ of the mirror assembly 32. The collector or engine 70 and electrical generator 70a travel with the boom 34 and produce electrical energy or solar energy converted to other form which is conveyed via conduit 72 to the region of the point x where it is conveyed by flexible member or swivel joint to a fixed energy receiver 73. This energy receiver 73 may be a junction box or battery storage system where electricity is conveyed from the electrical generator 70a via conduit 72.

If the heat collector 70 produces energy in any form other than electric current, the conduit 72 and receiver 73 will be selected to be compatible. For example, if collector 70 produces a heated fluid, the conduit 72 will be a fluid conducting pipe and receiver 73 may be a heat exchanger or storage device. In the case of a fluid conducting heat system, a single flexible or rotary joint assembly located at point x is sufficient. Again the energy receiver 73 is fixed and the point x is fixed so that relatively little movement and simplicity of connection between the conduit 72 and energy receiver 73 is achieved. An electrical cable may be used as it is subject to appoximately 90 degrees of flexing in the vertical direction and 200 degrees of movement about the vertical axis. Modern electrical cables are capable of that degree of movement without danger to their physical and electrical integrity.

Referring specifically to FIG. 7 the engine 70 may be seen with its entrance orifice 71 directed toward the mirror 32 of FIG. 6. The conduit 72 is shown secured to the boom arm 36. It must be recognized that depending on the nature of the engine 70 mounted on the boom 34 the conduit 72 will be appropriately selected to those skilled in the art.

The ray patterns of the embodiment of FIGS. 6 and 7 is similar to that of FIGS. 3 and 4 in that the incident rays i intercept the mirror 32 and are reflected as rays r towards the end of the boom 34. In this case the energy, however, is collected in the collector for engine 70 and there is no further beam c as in the case of the earlier embodiment. The same geometric relationships as to beams i and r however exist. The longitudinal position of the engine 70 will depend upon its entrance orifice and the degree of concentration desired for its optimum operation. The orifice may be located either ahead of or beyond the first focus sufficient distance to match the orifice size but for all practical purposes it appears at the first focus $f_1$.

Figure 10:
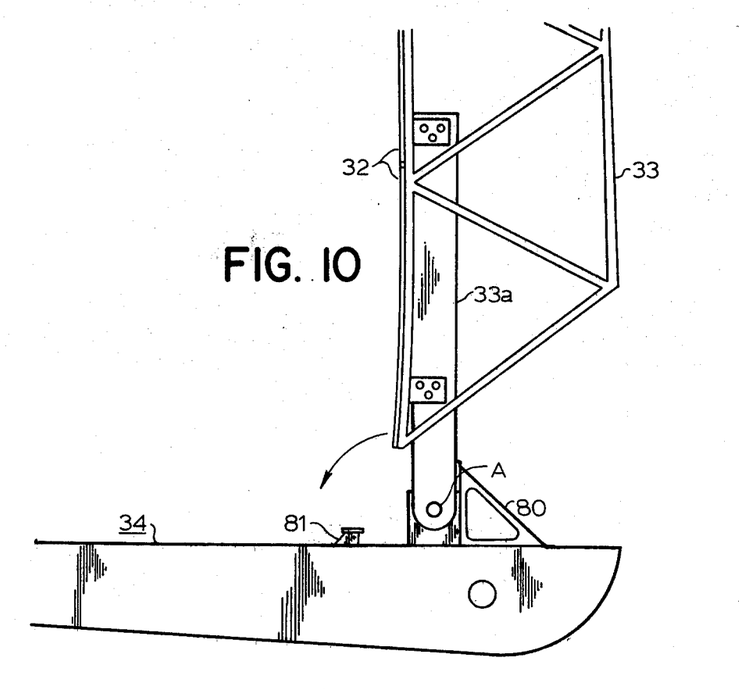
FIG. 10 is a fragmentary side elevational view of a foldable boom and concentrator assembly of this invention.

One of the important features of this invention is illustrated in FIG. 10. As described above a particularly useful application of this invention is for mobile homes or for individual residents use where a convenient size and even moveable solar energy collector concentrator is desired. Often homes in desert or mountain areas are prime candidates for this invention. These areas however are often subject to high wind level. Nearly all other flat plate and concentrating collector designs are subject to the need for the design of wind loading and are subject to sand or hail conditions. Employing this invention where the mirror assembly extends to one side only of the symmetrical axis of the parabolic reflector it is possible to hinge the mirror assembly and to allow it to be folded down against the boom during non-use periods. Also, the boom carrying the secondary mirror 40 of FIG. 1 or the engine 70 of FIG. 6 may be folded down into a horizontal position lying immediately above the turret and ring. The elevational movement of the boom 34 is described in connection with the drawing figures above. The training capability of a boom allows the assembly to be oriented in any preferred direction for storage or transport.

As shown in FIG. 10 the mirror assembly on its frame 33 may also be pivoted around the A axis between its collecting condition as shown in FIG. 10 with a vertical support member 33a bearing against an upright stop 80. The mirror assembly is further rotatable downward in the direction of the arrow until the auxiliary support member 33a engages lower stop 81. In this particular case the movement downward results in the mirror surface 32 being protected from abrasion by wind or hail and the overall profile of the assembly is reduced tremendously The upstanding support arms of the frame work 33 have relatively little wind loading since it is an open structure. The boom assembly itself is relatively small in profile and thus the entire assembly when in an non-use condition may be folded down out of the way and the mirror itself is protected. In severe climates it is important the mirror surface is not exposed to snow. The auxiliary movement from a storage position to an operating position as shown in FIG. 10 can be accomplished manually or with a simple drive mechanism comparable to those employed in the training an elevational function.

In the final consideration of this invention, it should be recognized that in accordance with our teaching the solar energy collector and boom are positioned outside of the solar energy collecting window defined by the concentrator. Thus no shadowing occurs.

Also, it should be noted that using a hemi-parabolic section as is disclosed does not result in any loss of collection since solar energy collection depends initially upon the total collection area of the concentrator and not its position relative to the axis at the parabola.

The above described embodiments of this invention are merely descriptive of its principles and are not to be considered limiting. The scope of this invention instead shall be determined from the scope of the following claims, including their equivalents.

We claim:

1. A solar energy concentrator and collector assembly comprising,
   a base having a vertical axis;
   a turret mounted on said base for rotation about said vertical axis;
   a concentrator/collector assembly amounted on said turret for rotation about a second axis intersecting said second axis;
   the primary concentrator of said concentrator/collector assembly constituting an array of concentrating mirrors formed in substantially a hemi-parabolic section configuration;
   the collector of said concentrator/collector assembly including an elongated boom extending normal to and through said second axis and a solar energy collector positioned on said boom substantially at the focus region of said concentrator;
   said concentrator extending substantially entirely above the plane defined by said boom and said second axis; and means for receiving energy from said concentrator/collector located substantially at the intersection of said axes.

2. The combination in accordance with claim 1 wherein said second axis is substantially horizontal.

3. The combination in accordance with claim 1 wherein said base defines a circular track about the position of intersection of said first and second axes with the region of the intersection of said first and second axes unobstructed by said track and turret whereby said solar collector assembly is rotatable about said vertical axis by movement of said turret and said energy receiving means is unobstructed by the mechanical elements of said assembly.

4. The combination in accordance with claim 1 wherein said solar concentrator is displaced to one side of said plane by an amount at least equal to the transverse dimension of said collector whereby said collector produces no shadow on the concentrator when said concentrator is directed at the sun and energy therefrom is concentrated at said collector.

5. The combination in accordance with claim 1 including energy conveyance means coupled to said solar energy collector conveying collected energy via said boom to the region of the intersection of said vertical and second axis.

6. The combination in accordance with claim 5 wherein said apparatus includes a fixed energy receiver positioned at said base and extending through the region of the intersection.

7. The combination in accordance with claim 6 including flexible conducting means in the region of the intersection of said vertical and second axis for transferring energy from said energy conveying means to said energy receiver.

8. The combination in accordance with claim 1 wherein said solar concentrator comprises a hemi-parabolic section.

9. The combination in accordance with claim 8 wherein said hemi-parabolic mirror comprises a plurality of discrete elements.

10. The combination in accordance with claim 9 wherein said mirror is secured to said boom at a generally 90 degree angle when said apparatus is in solar energy collection condition.

11. The combination in accordance with claim 10 wherein said mirror is pivotally mounted with respect to said boom whereby said mirror may be pivoted toward said boom to reduce the overall height and wind resistance of said assembly when in a non-solar energy collecting condition.

12. The combination in accordance with claim 1 wherein said base defines a circular track and said turret includes three support assemblies angularly placed about said vertical axis for engaging said track and for providing stable rotation about said vertical axis and drive means coupled to at least one of said support assemblies for driving said turret about said vertical axis said support means spaced from said receiver whereby the mechanical drive means of said assembly does not interfere with the collection and reception of energy by said apparatus.

13. The combination in accordance with claim 1 wherein each of said concentrating mirrors is individually mountable with respect to said framework.

14. The combination in accordance with claim 1 wherein said solar collector comprises a heat engine including an energy input window exposed to said solar concentrator.

15. The combination in accordance with claim 1 wherein said collector and boom are positioned outside of the solar energy collecting window as defined by said concentrator when in a solar energy collection condition.

16. The combination in accordance with claim 1 wherein said solar energy collector comprises a secondary mirror concentrator mounted on said boom in the region of the focus of said primary concentrator; and
a solar energy receiver located at the intersection of said axes.

17. The combination in accordance with claim 1 wherein a solar energy receiver is mounted on said boom substantially at the focus of said primary concentrator; and
including means conveying energy from said receiver to said base via the region of the intersection of said axes.

18. A solar energy concentrator and collector assembly comprising,
a base having a vertical axis;
a turret mounted on said base for rotation about said vertical axis;
a concentrator/collector assembly amounted on said turret for rotation about a second axis intersecting said second axis;
the primary concentrator of said concentrator/collector assembly constituting a concentrating mirror formed in substantially a hemi-parabolic section configuration;
the collector of said concentrator collector assembly including an elongated boom extending normal to said second axis and a solar energy collector positioned or said boom substantially at the focus region of said concentrator;
said concentrator extending substantially entirely above the plane defined by said boom and said second axis; and means for receiving energy from said concentrator/collector located within said turret in the region of the intersection of said axes.

* * * * *

UNITED STATES PATENT AND TRADEMARK OFFICE
CERTIFICATE OF CORRECTION

PATENT NO. : 4,408,595

Page 1 of 2

DATED : October 11, 1983

INVENTOR(S) : Howard Frank Broyles, Mark L. White and Neil Floyd Dipprey

It is certified that error appears in the above-identified patent and that said Letters Patent is hereby corrected as shown below:

| | |
|---|---|
| Column 1, line 8, | cancel "been" and insert ---seen---; |
| Column 2, line 19 | cancel "followup" and insert "follow-up" |
| Column 3, line 30 | cancel "aximuth" and insert ---azimuth---; |
| Column 3, line 66 | cancel "or" and insert ---of---; |
| Column 4, line 16 and 20 | cancel "frust-conical" and insert ---frusto-conical---; |
| Column 4, line 24 | cancel "aginst" and insert ---against---; |
| Column 5, line 33 | cancel "to" and insert ---by---; |
| Column 6, line 14 | after "tremendously" insert a period. |

UNITED STATES PATENT AND TRADEMARK OFFICE
CERTIFICATE OF CORRECTION

PATENT NO. : 4,408,595

DATED : October 11, 1983

INVENTOR(S) : Howard Frank Broyles, Mark L. White and Neil Floyd Dipprey

It is certified that error appears in the above-identified patent and that said Letters Patent is hereby corrected as shown below:

IN THE CLAIMS

Claim 1, line 47   cancel "amounted" and insert ---mounted---;

Claim 1, line 49   cancel "second" and insert ---vertical---;

Claim 18, line 35   cancel "amounted" and insert ---mounted---.

Signed and Sealed this

Fifth Day of June 1984

[SEAL]

Attest:

GERALD J. MOSSINGHOFF

Attesting Officer   Commissioner of Patents and Trademarks